(12) United States Patent

Mittal et al.

(10) Patent No.: US 9,564,644 B2
(45) Date of Patent: Feb. 7, 2017

(54) HYDRATING A FUEL CELL

(75) Inventors: Vishal Onkarmal Mittal, Kanagam Chennai (IN); Robert Mason Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 768 days.

(21) Appl. No.: 13/818,873

(22) PCT Filed: Aug. 31, 2010

(86) PCT No.: PCT/US2010/047202
§ 371 (c)(1),
(2), (4) Date: Feb. 25, 2013

(87) PCT Pub. No.: WO2012/030324
PCT Pub. Date: Mar. 8, 2012

(65) Prior Publication Data
US 2013/0149619 A1  Jun. 13, 2013

(51) Int. Cl.
*H01M 8/04* (2016.01)
*H01M 8/02* (2016.01)

(52) U.S. Cl.
CPC ......... *H01M 8/04082* (2013.01); *H01M 8/026* (2013.01); *H01M 8/04097* (2013.01); *H01M 8/04291* (2013.01); *H01M 8/04753* (2013.01); *H01M 8/1007* (2016.02); *Y02E 60/50* (2013.01)

(58) Field of Classification Search
CPC  H01M 8/026; H01M 8/0429; H01M 8/04082; H01M 8/04097; H01M 8/1002; H01M 8/04753; H01M 8/04402; H01M 8/0441; H01M 8/04223; H01M 8/0612; H01M 2250/25; H01M 2008/147; Y02E 60/521; Y02E 60/50; Y02T 90/32

USPC ................................. 429/415, 444, 514, 411
See application file for complete search history.

(56) References Cited

U.S. PATENT DOCUMENTS

| | | |
|---|---|---|
| 5,846,668 A | 12/1998 | Watanabe |
| 6,964,824 B2 | 11/2005 | Enjoji et al. |
| 2001/0028970 A1 | 10/2001 | Sano et al. |
| 2002/0071981 A1 | 6/2002 | Sano et al. |
| 2004/0121199 A1* | 6/2004 | Balan ............... H01M 8/04022 429/415 |

(Continued)

FOREIGN PATENT DOCUMENTS

| | | | |
|---|---|---|---|
| JP | 08203546 A | * 8/1996 | ............ H01M 8/02 |
| JP | 9-245819 A | 9/1997 | |

(Continued)

OTHER PUBLICATIONS

Machine Translation and Abstract in English of JP 08203546.*

(Continued)

*Primary Examiner* — Jonathan G Leong
*Assistant Examiner* — Brent Thomas
(74) *Attorney, Agent, or Firm* — Seed IP Law Group LLP

(57) ABSTRACT

An example method of controlling fluid distribution within a fuel cell includes adjusting a flow of a reactant moving within a fuel cell to increase water within a portion of the fuel cell. Another example method of controlling fluid distribution within a fuel cell includes adjusting a flow of fuel entering a fuel cell, a velocity of air entering the fuel cell, or both, so that a first amount of water exiting the fuel cell in a fuel stream is about the same as a second amount of water exiting the fuel cell in an airstream.

19 Claims, 3 Drawing Sheets

(56) References Cited

U.S. PATENT DOCUMENTS

| | | | | |
|---|---|---|---|---|
| 2006/0251935 A1* | 11/2006 | Barrett | ............. | H01M 8/04097 |
| | | | | 429/415 |
| 2007/0218323 A1* | 9/2007 | Sudo | ................ | H01M 8/04089 |
| | | | | 429/413 |
| 2010/0129689 A1* | 5/2010 | Lim et al. | ....................... | 429/13 |
| 2011/0104577 A1* | 5/2011 | Cui et al. | ..................... | 429/411 |

FOREIGN PATENT DOCUMENTS

| | | | |
|---|---|---|---|
| JP | 2001-256988 A | | 9/2001 |
| JP | 2002-184428 A | | 6/2002 |
| JP | 2004-79435 A | | 3/2004 |
| JP | 2004-327063 A | | 11/2004 |
| JP | 2007-52937 A | | 3/2007 |
| JP | 2007123095 | | 5/2007 |
| JP | 2007-242564 A | | 9/2007 |
| JP | 2008103169 | | 5/2008 |
| JP | 2009-193722 A | | 8/2009 |
| JP | 2009176454 | | 8/2009 |
| JP | 2010160995 A | * | 7/2010 |
| JP | 2011-519466 A | | 7/2011 |
| WO | 2009/131574 A1 | | 10/2009 |

OTHER PUBLICATIONS

Machine Translation and Abstract in English of JP 2010160995.*
International Search Report and Written Opinion for PCT/US2010/047202 dated May 30, 2011.

* cited by examiner

HYDRATING A FUEL CELL

CROSS-REFERENCE TO RELATED APPLICATIONS

This application is the U.S. national phase of PCT/US2010/047202, filed Aug. 31, 2010.

TECHNICAL FIELD

This disclosure relates generally to fuel cells. In particular, this disclosure relates to hydrating a fuel cell.

DESCRIPTION OF RELATED ART

Fuel cell assemblies and power plants are well known. One example fuel cell assembly includes multiple individual fuel cells arranged in a stack. Each individual fuel cell has an anode and a cathode positioned on either side of a polymer electrolyte membrane. A fuel, such as hydrogen, is supplied to the anode side of the polymer electrolyte membrane. An oxidant, such as air, is supplied to the cathode side of the polymer electrolyte membrane. The fuel and the oxidant initially move through channels established within plates. Gas diffusion layers distribute some of the hydrogen and the air from the channels to other portions of the fuel cell. Molecules of the hydrogen are oxidized in the catalyst layer located on the anode side of the polymer electrolyte membrane. The hydrogen protons resulting from the oxidizing move through the polymer electrolyte membrane to the cathode side. The electrons resulting from the oxidizing travel to the cathode side through an external circuit, which provides electrical current.

Increasing the humidity of the gases entering the fuel cell desirably increases the conductivity of the polymer electrolyte membrane. Humidifiers are often used to humidify the air entering the fuel cell. In some working environments, such as in automotive applications, it is desirable to eliminate the external humidifiers to reduce complexity and weight. As can be appreciated, eliminating the humidifiers results in less humid air entering the fuel cell. The conductivity of polymer electrolytes decreases as the humidity of air entering the fuel cell decreases, which can affect the performance and durability of the fuel cell.

SUMMARY

An example method of controlling fluid distribution within a fuel cell includes adjusting a volumetric flow of a reactant moving within a fuel cell to increase the amount of water within a portion of the fuel cell.

Another example method of controlling fluid distribution within a fuel cell includes adjusting a volumetric flow of fuel entering a fuel cell, volumetric flow of air entering the fuel cell, or both, so that a first amount of water exiting the fuel cell in a fuel stream is about the same as a second amount of water exiting the fuel cell in an air stream.

An example fuel cell device includes an electrode assembly and a first plate adjacent the electrode assembly that is configured to communicate a fuel from a fuel inlet to a fuel outlet. A first amount of water and at least some of the fuel are exhausted from the fuel cell at the fuel outlet. A second plate is adjacent the electrode assembly on an opposite side of the electrode assembly from the first plate. The second plate is configured to carry an oxidant from an oxidant inlet to an oxidant outlet. A second amount of water and at least some of the oxidant is exhausted from the fuel cell at the oxidant outlet. The first amount of water is about the same as the second amount of water in one example.

Another example fuel cell device includes an electrode assembly of a fuel cell and the first plate adjacent the electrode assembly. The first plate has at least one first channel configured to communicate a fuel from a fuel inlet to a fuel outlet. A volumetric flow of fuel communicating through the first channel is increased to redistribute water within the fuel cell. A second plate is adjacent the electrode assembly on an opposite side of the electrode assembly from the first plate. The second plate has at least one second channel configured to carry an oxidant in from an oxidant inlet to an oxidant outlet. A volumetric flow of oxidant communicating through the at least one second channel is adjustable to redistribute water within the fuel cell.

These and other features of the disclosed examples can be best understood from the following specification and drawings. The following is a brief description of the drawings.

DETAILED DESCRIPTION

Figure 1:
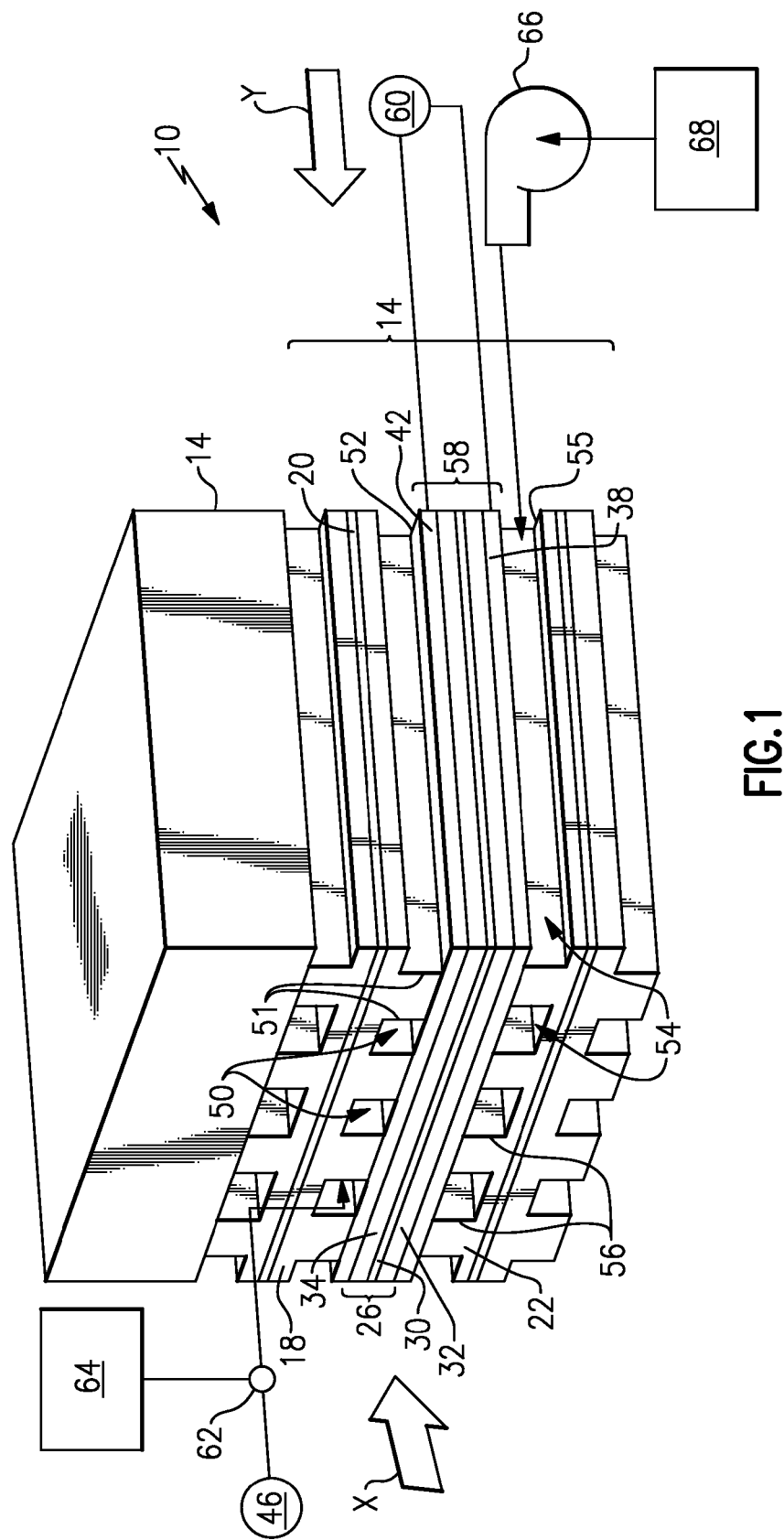
FIG. 1 shows a perspective, schematic view of an example fuel cell assembly.

Referring to FIG. 1, an example proton exchange membrane fuel cell 10 includes multiple individual fuel cells 14 arranged in a stack. Each fuel cell 14 includes an anode plate 18 and a cathode plate 22 on opposing sides of a membrane electrode assembly 26. The membrane electrode assembly 26 includes a proton exchange membrane 30 positioned between catalyst layers 32 and 34. The typical cell package, as shown, has a solid separator plate 20 between the anode plate 18 and cathode plate 22. The solid plate 20 may be a separate element or it may be an integral part of either 18 or 22. While not shown for clarity reason each cell or number of cells may include a cooler plate.

A cathode side gas diffusion layer 38 is arranged between the cathode plate 22 and the membrane electrode assembly 26. The membrane electrode assembly 26 includes the anode catalyst layer 34, the proton exchange membrane 30, and the cathode catalyst layer 32. An anode side gas diffusion layer 42 is arranged between the anode plate 18 and the membrane electrode assembly 26. In this example, a unitized electrode assembly 58 of the fuel cell 14 includes the cathode side gas diffusion layer 38, the anode side gas diffusion layer 42, and the membrane electrode assembly 26.

A fuel source 46 supplies a fuel, such as hydrogen, to the fuel cell assembly 14. A controller 64 controls a valve 62 to control delivery of fuel. In the FIG. 2 example, fresh fuel from source 46 is mixed with fuel recycled from the exit of the cell assembly 14 at a mix point 48, and the resulting mixture is fed to the to the fuel channels 50 (or fuel flow fields) within the anode plate 18. The valve 62 controls fuel flow from the source 46 to the mix point 48. A purge valve 63 controls fuel flow from the fuel cell assembly 14. The example of FIG. 1 does not utilize recycled fuel.

In one example, the fuel 46 is dry (does not contain water), while the recycled fuel may contain a fraction of the water generated in the fuel cell 14. Ejectors (not shown) or a recycle blower 49, which may be variable speed, may be used to return the recycled fuel to the mix point 48. An oxidant source 53 supplies an oxidant, such as air, to oxidant channels 54 (or oxidant flow fields) within the cathode plate 22. Air is supplied with a variable speed blower or a compressor 66. If oxygen is the oxidant source, then the flow is typically controlled by a valve (not shown).

In this example, the fuel moves within the fuel cell 14 through the fuel channels 50, which extend from a plurality of fuel inlets 51 to a plurality of fuel outlets 52. The gas diffusion layer 42 distributes some of the fuel from the fuel channels 50 to the catalyst layer 42. The oxidant moves within the fuel cell 14 through the oxidant channels 54, which extend from a plurality of oxidant inlets 55 to a plurality of oxidant outlets 56. The gas diffusion layer 38 distributes some of the oxidant from the oxidant channels 54 to the catalyst layer 34.

The example fuel cell 14 of FIG. 1 is a counter-flow fuel cell. That is, the fuel moves through the fuel channels 50 in a direction X that is generally opposite to a direction Y of oxidant movement through the oxidant channels 54. In this example, the direction X is directly opposite to the direction Y. The hydrogen and the air are the reactants in the example fuel cell 14. As the reactants move through the fuel cell 14, the catalyst layer 32 separates the hydrogen to provide protons, and the catalyst layer 34 separates the oxygen molecules in the air to provide reactive oxygen intermediates that reside on the surface of the cathode catalyst. The electrons from the separated hydrogen ions are used to power a load 60. The protons pass across the proton exchange membrane 30 and react with the oxygen intermediates at the cathode, which forms water and produces thermal energy.

In this example, the flow of fuel moving through the fuel channels 50 and the flow of air moving through the oxidant channels 54 are adjusted relative to each other to increase the amount of water within the fuel cell 14. The amount of water within the fuel cell 14 peaks when the flow of fuel and the flow of air entering the fuel cell 14 are approximately equal. In other words, the amount of water in the fuel cell 14 peaks when the ratio of the entering fuel flow divided by entering air flow is approximately one. The amount of water in the cell decreases, which causes the performance to decrease, when this ratio is significantly less than one or significantly greater than one. If the example were cross-flow the results would be less effective and very ineffective for or co-flow configuration.

In some examples, a fuel cell operates on hydrogen and air, and the hydrogen flow entering the fuel cell is 1.2 times the stoichiometric amount, and the oxygen flow is 2 times the stoichiometric amount. For pure hydrogen and air fed at these stoichiometric ratios, the ratio of entering fuel flow to entering air flow is approximately 0.25. This is considerably lower than the desired ratio of 1.

One example technique for achieving the desired ratio of flows includes increasing the flow of fuel while holding constant the flow of air. The example adjustment causes water near the area of the cell air outlets 55 to move through the polymer electrolyte membrane 30 toward the fuel inlets 51.

Since air contains only 20% oxygen, decreasing the air flow while holding the fuel flow constant to yield a flow ratio of one is not possible in this case since it causes significant performance loss from a lack of oxygen. Thus, increasing the fuel flow will generally be the preferred approach. In the case where the fuel flow is a dilute hydrogen mix, air adjustments could play a more significant role.

In this example, the variable speed recycle blower 49 is linked to a controller 65. The variable speed recycle blower 49 is used to control the flow of recycled fuel to the mix point 48 and subsequently the fuel inlets 51. The speed of the recycle blower 49 increases to allow more fuel to move to the fuel inlets 51, for example, which increases the flow of fuel moving through the fuel channels 50. More of the water tends to move from the unitized electrode assembly 58 into the fuel channels 50 when the flow of the fuel moving through the fuel channels 50 is increased. The water is then more easily convected into other areas of the fuel cell 14.

More water typically exits the fuel cell 14 at the oxidant outlets 56 because water is produced on the cathode side of the membrane electrode assembly 26, and also because of electroosmotic drag of water. As known, the oxidant channels 54 facilitate the movement of water to the oxidant outlets 56.

In this example, a variable speed air compressor 66 linked to a controller 68 is used to control the flow of oxidant from the oxidant source 53 to the oxidant inlets 55. The air compressor 66 adjusts to hold the oxidant flow to the fuel cell 14, at a constant utilization rate through the oxidant channels 54. When the flow of the oxidant moving through the oxidant channels 54 is about equal to the fuel flow, more of the water tends to distribute into areas of the fuel cell 14 rather than continue to move through the oxidant channels 54.

Figure 3:
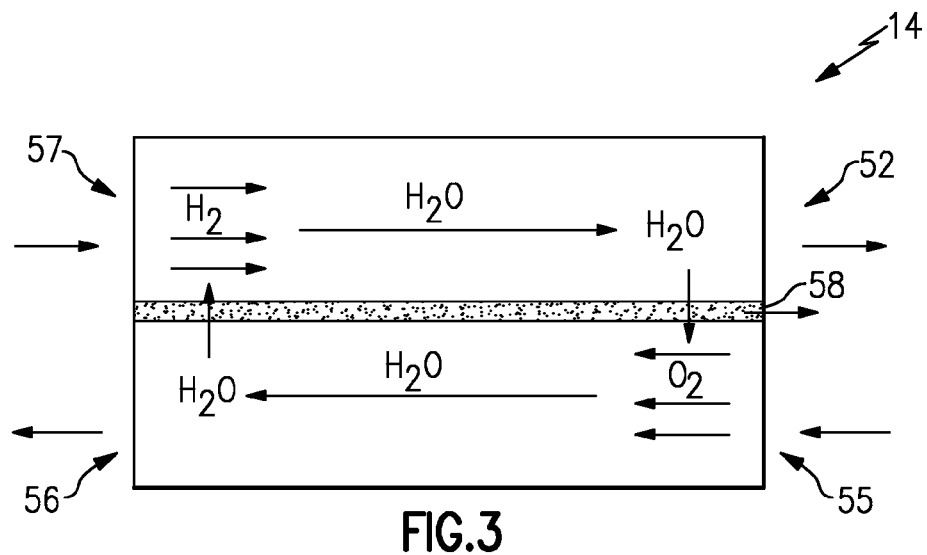
FIG. 3 shows a highly schematic view of water distribution within a fuel cell of the FIG. 1 assembly.

Generally, increasing the flow of fuel moving through the fuel channels 50 to achieve a nearly equal fuel to air flow ratio and maintaining the flow of air, to hold a constant utilization, moving through the oxidant channels 54 circulates water throughout the fuel cell 14. An example of the path of water circulation through the fuel cell 14 is shown in FIG. 3. Such circulation is especially beneficial when the oxidant source 53 is not humidified before entering the fuel cell 14, such as when the fuel cell assembly 10 lacks a connection to an external humidifier and the fuel cell contains at least one solid separator plate.

Figure 2:
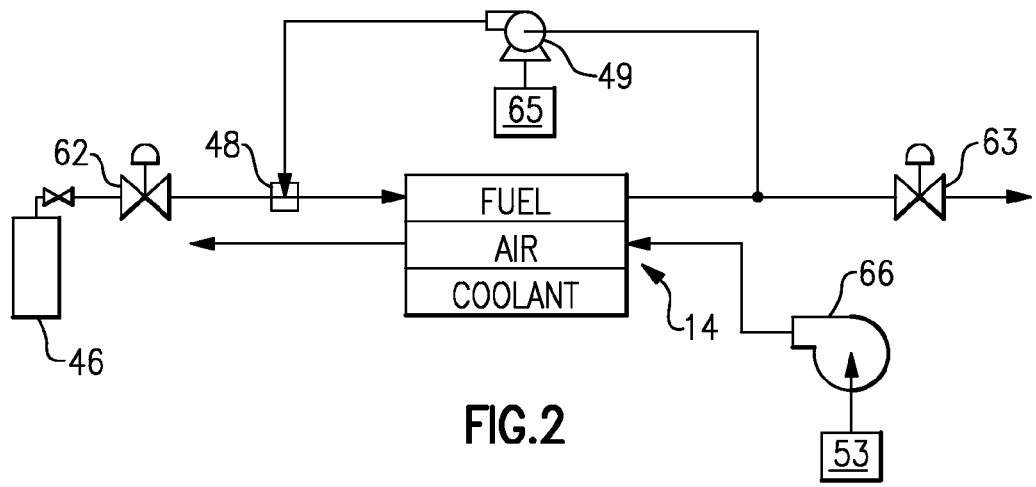
FIG. 2 shows another example fuel cell assembly having a fuel recycle loop.
Figure 4:
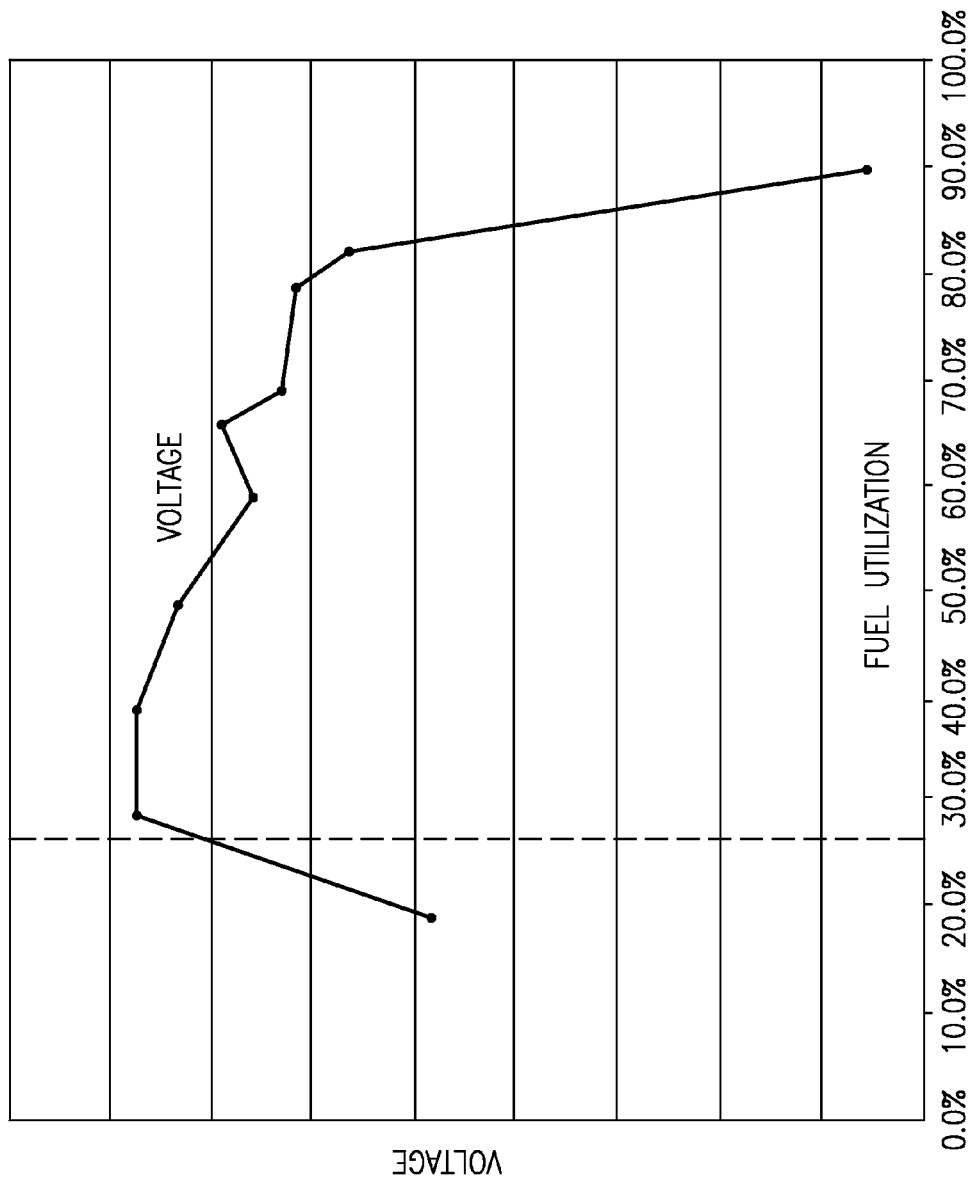
FIG. 4 shows a graph of fuel cell performance verses. fuel utilization

Referring to FIG. 4 with continuing reference to FIGS. 1 and 2, in a specific example, the fuel cell 14 is a solid plate fuel cell operating with a coolant exit temperature of 80° C. with hydrogen fuel and oxidant air exiting the fuel cell 14 at 40 kPag. The dew point at the fuel inlets 51 is 53° C. The cathode humidifier temperature is room temperature (about 25° C.) and the relative humidity at the oxidant inlets 55 is about 7%.

The fuel utilization within the fuel cell 14 was then decreased while the air utilization was fixed at 67% to cause an increase in the flow of fuel moving through the fuel channels 50 while maintaining the flow of air moving through the oxidant channels 54.

As the fuel utilization decreases from 90% to 30% the cell performance increases as predicted until the utilization reaches the predicted maximum performance, which is at about 30% utilization in this example. This reflects an improved water distribution with the cell package including the membrane. Below this 30% $H_2$ utilization, the performance again decreases due to increasing water imbalance.

Figure 5:
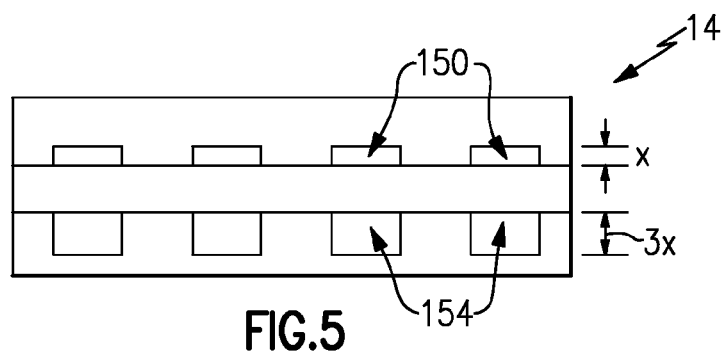
FIG. 5 shows a section view of an example fuel cell.

FIG. 5 shows a schematic cross-sectional view of an example fuel cell 114 having a plurality of fuel channels 150 and a plurality of oxidant channels 154. The fuel channels 150 are configured to have a shorter path length for transport of water from the UEA than the air channels. This configuration favors transportation of water to the fuel stream over transport of water to the air stream. This reduction in transport resistance helps move water to the fuel stream and can be combined with the optimum flow strategy.

As can be appreciated from FIG. 5, the channel depth of the oxidant channels 154 is three times that of the depth of the fuel channels 150. Specifically, in this example, the depth of the oxidant channels 154 is 0.75 mm and the depth of the fuel channels 150 is 0.25 mm. The width of the oxidant channels 154 is about the same as the width of the fuel channels 150. The fuel channels 150 thus have a smaller cross-section than the oxidant channels 154. Accordingly, an equal flow of gas would move through the fuel channels 150 faster than the oxidant channels 154. This higher fuel flow velocity and lower channel depth enhances water movement through the membrane and into the relatively dry fuel gas at the fuel inlet. In this example, the ratio of oxidant channel depths to fuel channel depth is best at about 3:1. Other examples include other ratios.

In another example, the width of the oxidant channels 154, the fuel channels 150, or both are adjusted to change the transport resistance for water moving from the UEA to the fuel or air channels.

In yet another example, the width and the depth of the of the oxidant channels 154, the fuel channels 150, or both are adjusted to change the relative transport lengths for water of reactants moving through the fuel cell 114.

Referring again to the example of FIG. 2, the speed of the recycle blower 49 is dependent on the flow of fuel and the flow of air. In this example, the speed of the recycle blower 49 is adjusted so that the flow of fuel matches the flow of air. The method may turn the recycle blower 49 on when the fuel cell 14 is operated in a condition that would cause the membrane to dry. Such a condition is identified by calculations or by measuring resistance of the membrane, for example.

The method may also measure water content to determine when to operate the recycle blower 49. For example, if the amount of water carried by the oxidant exiting the fuel cell 14 is about the same as the amount of water carried by the fuel exiting the fuel cell, no adjustments are made. If the amount of water carried by the oxidant is not about the same as the amount of water carried by the fuel, the method adjusts the flow of fuel moving through the fuel cell 14. The flow of fuel moving through the fuel channels 50 is adjusted so that the amount of water carried by the air exiting the fuel cell 14 at the oxidant outlets 56 approximately matches the amount of water carried by the fuel exiting at the fuel outlets.

In another example, the flow of fuel moving through the fuel channels 50 is adjusted so that the amount of water carried by the fuel exiting the fuel cell 14 matches the amount of water carried by the oxidant exiting the fuel cell 14. Adjusting oxidant flow is not utilized in some examples as the adjustments can cause performance to decrease and cannot be decreased enough to compensate typical fuel flows.

Features of this invention include operating a fuel cell stack assembly with drier reactants in a relatively uncomplicated manner. Another feature of this invention is operating a fuel cell stack assembly without requiring an external humidifier.

Thus, we find that increasing the flow of relatively dry fuel to the fuel cell results in improved hydration of the membrane, which is counter to expectation and would not occur in a fuel cell with co-flow fuel and air.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of operating a fuel cell to control fluid distribution within a fuel cell comprising:
   adjusting an amount of fuel entering the fuel cell and an amount of oxidant entering the fuel cell, the adjusting including;
     holding an oxidant utilization rate of the fuel cell constant to maintain a constant flow of oxidant moving through oxidant channels of the fuel cell; and
     while holding the oxidant utilization rate constant, decreasing a fuel utilization rate of the fuel cell, the decreasing of the fuel utilization rate increasing a flow of fuel moving through fuel channels of the fuel cell so that a first amount of water exiting the fuel cell in a fuel stream is about the same as a second amount of water exiting the fuel cell in an oxidant stream.

2. The method of claim 1, wherein the flow of fuel is increased while the flow of oxidant is held constant to approach a desired fuel/oxidant flow ratio of about 1.

3. The method of claim 1, wherein the flow of fuel contains a portion of fuel recycled from a fuel cell exit.

4. The method of claim 1, including balancing the water exiting the fuel cell in the fuel stream with the water exiting the fuel cell in the oxidant stream to increase the water within the membrane of the fuel cell.

5. The method of claim 1, wherein the fuel flows through the fuel cell in a first direction and the oxidant flows through the fuel cell in a second direction that is counter to the first direction.

6. A fuel cell system comprising:
   an electrode assembly;
   a first plate adjacent the electrode assembly, the first plate having at least one fuel flow channel configured to transport fuel in a first direction from a fuel inlet to a fuel outlet, wherein, during operation, a first amount of water and at least some of the fuel are exhausted from the fuel cell through the fuel outlet; and
   a second plate adjacent the electrode assembly on an opposite side of the electrode assembly from the first plate, the second plate having at least one oxidant flow channel configured to transport oxidant in a second direction from an oxidant inlet to an oxidant outlet, wherein, during operation, a second amount of water and at least some of the oxidant is exhausted from the fuel cell through the oxidant outlet; and
   at least one controller configured to, during at least a portion of operation of the fuel cell;
     hold an oxidant utilization rate of the fuel cell constant to maintain a constant volumetric flow rate of oxidant through the at least one oxidant flow channel of the second plate;
     while holding the oxidant utilization rate constant, decrease a fuel utilization rate of the fuel cell to increase a volumetric flow rate of fuel moving through the at least one fuel flow channel of the first plate so that the first amount of water exhausted from the fuel cell through the fuel outlet is about the same as the second amount of water exhausted from the fuel cell through the oxidant outlet.

7. The fuel cell system of claim 6, wherein the first direction is counter to the second direction.

8. The fuel cell system of claim 6, wherein one of the first plate or the second plate is a solid plate.

9. A fuel cell system comprising:
an electrode assembly of a fuel cell;
a first plate adjacent the electrode assembly, the first plate having at least one first channel configured to communicate a volumetric flow of fuel in a first direction from a fuel inlet to a fuel outlet;
a second plate adjacent the electrode assembly on an opposite side of the electrode assembly from the first plate, the second plate having at least one second channel configured to carry a volumetric flow of oxidant in a second direction from an oxidant inlet to an oxidant outlet; and
at least one controller configured to, during at least a portion of operation of the fuel cell;
hold an oxidant utilization rate of the fuel cell constant to maintain a constant volumetric flow rate of oxidant through the at least one second channel of the second plate; and
while holding the oxidant utilization rate constant, decrease a fuel utilization rate of the fuel cell to a value below which water imbalance increases, the decreasing of the fuel utilization rate of the fuel cell causing an increase in a volumetric flow rate of fuel moving through the at least one first channel of the first plate.

10. The fuel cell system of claim 9, wherein the first direction is counter to the second direction.

11. The fuel cell system of claim 9, wherein one of the first plate or the second plate is a solid plate.

12. The fuel cell system of claim 9, wherein the ratio of a depth of the first channel to a depth of the second channel is 1:3.

13. The fuel cell system of claim 6, further comprising:
a recycle blower, and
wherein the at least one controller is operatively coupled to the recycle blower to control the recycle blower to supply the increased volumetric flow rate of fuel transported through the at least one fuel flow channel of the first plate.

14. The method of claim 1 wherein decreasing the fuel utilization rate of the fuel cell includes decreasing the fuel utilization rate to a value below which water imbalance increases.

15. The method of claim 1 wherein decreasing the fuel utilization rate of the fuel cell includes decreasing the fuel utilization rate to a value that maximizes output voltage.

16. The method of claim 1 wherein the constant flow of oxidant is a flow of non-humidified oxidant which moves through oxidant channels of the fuel cell.

17. The fuel cell system of claim 6 wherein the controller is configured to decrease the fuel utilization rate to a value below which water imbalance increases.

18. The fuel cell system of claim 6 further comprising a source of non-humidified oxidant, the source supplying the non-humidified oxidant which flows at the constant volumetric flow rate through the at least one oxidant channel of the second plate.

19. The fuel cell system of claim 9 further comprising a source of non-humidified oxidant, the source supplying the non-humidified oxidant which flows at the constant volumetric flow rate through the at least one second channel of the second plate.

* * * * *